(12) United States Patent
Nakamura et al.

(10) Patent No.: US 9,134,709 B2
(45) Date of Patent: Sep. 15, 2015

(54) POWER SUPPLY CONTROL DEVICE AND POWER SUPPLY CONTROL METHOD

(75) Inventors: Koji Nakamura, Osaka (JP); Takaaki Inaki, Aichi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 348 days.

(21) Appl. No.: 13/879,252

(22) PCT Filed: Sep. 2, 2011

(86) PCT No.: PCT/JP2011/004945
§ 371 (c)(1),
(2), (4) Date: Apr. 12, 2013

(87) PCT Pub. No.: WO2012/063388
PCT Pub. Date: May 18, 2012

(65) Prior Publication Data
US 2013/0218363 A1 Aug. 22, 2013

(30) Foreign Application Priority Data

Nov. 9, 2010 (JP) .................................. 2010-250895

(51) Int. Cl.
*G05B 13/02* (2006.01)
*H02J 13/00* (2006.01)
*H02J 3/14* (2006.01)

(52) U.S. Cl.
CPC ............. *G05B 13/02* (2013.01); *H02J 13/0006* (2013.01); *H02J 2003/143* (2013.01); *Y02B 70/3216* (2013.01); *Y02B 70/3266* (2013.01); *Y04S 20/221* (2013.01); *Y04S 20/242* (2013.01)

(58) Field of Classification Search
CPC ........... H02J 13/0006; H02J 2003/143; Y02B 70/3216; Y02B 70/326; G05B 13/02; Y04S 20/221; Y04S 20/242
See application file for complete search history.

(56) References Cited

U.S. PATENT DOCUMENTS 5,640,069 A * 6/1997 Nilssen ..................... 315/209 R
5,953,536 A * 9/1999 Nowlin, Jr. ................... 713/323
(Continued)

FOREIGN PATENT DOCUMENTS

CN 101165990 A 4/2008
JP 2002-125315 A 4/2002
(Continued)

OTHER PUBLICATIONS

Search Report for Chinese Application No. 2011800493342 dated Sep. 25, 2014.
(Continued)

*Primary Examiner* — Ramesh Patel
(74) *Attorney, Agent, or Firm* — Pearne & Gordon LLP (57) ABSTRACT

Provided is a power supply control device capable of reducing power consumption even when the amount of time the electrical equipment is used is indeterminate. This power supply control device (700) controls the supply of power to multiple lines on which electrical equipment is arranged, and has: a power supply control instruction unit (760), which provisionally supplies power to lines to which power is not being supplied; a power calculation unit (730), which determines for each line whether there has been an increase in the power consumption; and a power supply status determination unit (750) which, after power has been supplied provisionally, stops the provisional supply of power to a line when the power consumption on that line has not increased.

10 Claims, 9 Drawing Sheets

(56) References Cited

U.S. PATENT DOCUMENTS

| | | | | |
|---|---|---|---|---|
| 6,000,829 | A | * | 12/1999 | Kurokawa et al. ............... 700/95 |
| 6,100,643 | A | * | 8/2000 | Nilssen ..................... 315/209 R |
| 7,831,852 | B2 | * | 11/2010 | Yamazaki et al. ............. 713/324 |
| 2004/0024483 | A1 | * | 2/2004 | Holcombe ................... 700/122 |
| 2008/0098250 | A1 | * | 4/2008 | Yamazaki et al. ............. 713/340 |
| 2008/0307240 | A1 | * | 12/2008 | Dahan et al. .................. 713/320 |
| 2012/0326503 | A1 | * | 12/2012 | Birkelund ...................... 307/24 |
| 2013/0043725 | A1 | * | 2/2013 | Birkelund ...................... 307/24 |

FOREIGN PATENT DOCUMENTS

| | | |
|---|---|---|
| JP | 2003-110471 A | 4/2003 |
| JP | 2008-022669 A | 1/2008 |
| JP | 2010-213367 A | 9/2010 |

OTHER PUBLICATIONS

International Search Report for Application No. PCT/JP2011/00494 dated Nov. 22, 2011.

\* cited by examiner

| | LIVING ROOM LINE, WIRING ID: A1 | LIVING ROOM LINE, WIRING ID: A2 | LIVING ROOM LINE, WIRING ID: A3 | BED ROOM LINE, WIRING ID: B1 | BED ROOM LINE, WIRING ID: B2 | BED ROOM LINE, WIRING ID: B3 | ... |
|---|---|---|---|---|---|---|---|
| STANDBY POWER | 3.61 | 2.42 | 1 | 3.61 | 1 | 2.42 | ... |

| | LIVING ROOM LINE, WIRING ID: A1 | LIVING ROOM LINE, WIRING ID: A2 | LIVING ROOM LINE, WIRING ID: A3 | BED ROOM LINE, WIRING ID: B1 | BED ROOM LINE, WIRING ID: B2 | BED ROOM LINE, WIRING ID: B3 | ... |
|---|---|---|---|---|---|---|---|
| 10:10:01 | 0 | 0 | 0 | 0 | 0 | 0 | ... |
| 10:10:02 | 3.61 | 2.42 | 1 | 3.61 | 1 | 2.42 | ... |
| 10:10:03 | 3.61 | 2.42 | 1 | 3.61 | 1 | 2.42 | ... |
| : | : | : | : | : | : | : | ... |
| 10:11:00 | 3.61 | 2.42 | 1 | 323.61 | 1 | 2.42 | ... |

| | LIVING ROOM LINE, WIRING ID: A1 | LIVING ROOM LINE, WIRING ID: A2 | LIVING ROOM LINE, WIRING ID: A3 | BED ROOM LINE, WIRING ID: B1 | BED ROOM LINE, WIRING ID: B2 | BED ROOM LINE, WIRING ID: B3 | ... |
|---|---|---|---|---|---|---|---|
| POWER INCREASE | 0 | 0 | 0 | 320 | 0 | 0 | ... |

|  | LIVING ROOM | KITCHEN | TOILET | BATH ROOM | BED ROOM | GUEST ROOM |
|---|---|---|---|---|---|---|
| LIVING ROOM | 0 | 3m | 2m | 4m | 5m | 6m |

NUMBER OF ROOMS n 940, 941, 942

FIG. 8

|  | LIVING ROOM | KITCHEN | TOILET | BATH ROOM | BED ROOM | GUEST ROOM |
|---|---|---|---|---|---|---|
| LIVING ROOM | 0 | 6sec | 4sec | 8sec | 10sec | 12sec |

POWER SUPPLY CONTROL DEVICE AND POWER SUPPLY CONTROL METHOD

TECHNICAL FIELD

The present invention relates to a power feed control apparatus and a power feed control method which perform power feed control for multiple lines.

BACKGROUND ART

Recently, along with improvement of living level and an increase in the number of households, home energy consumption continues to increase.

In the energy consumption, electric power consumption is particularly outstanding. In addition to electric power consumed when household electrical equipment is used, electric power consumed in a standby state of the household electrical equipment (standby power) is a major cause of an increase in electric power consumption. According to the study of ECCJ (The Energy Conservation Center, Japan) in 2008, yearly electric power consumption is approximately 285 kWh only in the standby electric power consumption. This corresponds to 5,092 yen in terms of electricity expense and corresponds to 102 kg in terms of carbon dioxide ($CO_2$) emission amount.

The increase in carbon dioxide ($CO_2$) emission amount invites a serious problem like global warming. Accordingly, it has become an urgent matter to develop an energy innovation technique (HEMS: Home Energy Management System). HEMS is a mechanism of connecting household electrical equipment within a home by a network to enable a dweller to grasp electric power usage, so-called "visualization", and saving electric power by automatically controlling electric power usage for each piece of household electrical equipment.

However, it takes time to make network-compliant all pieces of household electrical equipment in the home and to make HEMS widespread. Further, costs a lot of money to make network-compliant the all pieces of household electrical equipment.

Accordingly, Patent Literature 1, for example, describes a power feed control apparatus capable of reducing power consumption while accommodating electrical equipment which is not network-compliant.

The power feed control apparatus described in Patent Literature 1 (hereinafter, called "conventional apparatus") retains a management table for each piece of electrical equipment. The management table registers predicted time when power feeding needs to be started for use by a user, and predicted time when the power feeding becomes unnecessary because the user does not use the electric power. That is, such predicted time is a predicted use schedule for each piece of the electrical equipment and determined according to a past use history for each piece of the electrical equipment, for example. Then, the conventional apparatus stops power feeding to the corresponding electrical equipment for a time period while the power feeding is not necessary, according to this management table.

Such a conventional apparatus can stop power feeding for electrical equipment in a time zone when the electrical equipment is predicted not to be used by a user, and thus can reduce standby electric power.

CITATION LIST

Patent Literature

PTL 1
Japanese Patent Application Laid-Open No. 2008-022669

SUMMARY OF INVENTION

Technical Problem

However, the conventional apparatus cannot deal with a case where user's actual usage is different from the contents of the management table. Accordingly, in the conventional apparatus, there is a possibility that power feeding is performed for electrical equipment in a time zone when the electrical equipment is not used actually and a large amount of standby power is consumed uselessly. Further, in the conventional apparatus, if there occurs frequently a situation that power feeding is not available when electric equipment is used actually, there is a possibility that a user deactivates the power feed control itself for avoiding a trouble of performing manual operation every time to start power feeding.

That is, the conventional apparatus has a problem that the power consumption cannot be reduced when use time of electric equipment is indeterminate.

An object of the present invention is to provide a power feed control apparatus and a power feed control method which can reduce power consumption even when use time of electrical equipment is indeterminate.

Solution to Problem

A power feed control apparatus of the present invention performs power feed control for multiple lines on which pieces of electrical equipment are arranged, and includes: a power feed control instruction section that performs provisional power feeding for the line to which power is not being fed, among the multiple lines; a power calculation section that determines whether or not there is an increase in power consumption, for each of the lines; and a power feed status determination section that, when the line exists in which the power consumption does not increase after the provisional power feeding has been performed, stops the provisional power feeding for the corresponding line.

A power feed control method of the present invention performs power feed control for multiple lines on which pieces of electrical equipment are arranged, and includes the steps of: starting provisional power feeding for the line to which power is not being fed, among the multiple lines; determining whether or not there is an increase in power consumption, for each of the lines; determining whether or not there exists the line in which the power consumption does not increase after the provisional power feeding has been performed; and stopping, when there exists the line in which the power consumption does not increase after the provisional power feeding has been performed, the provisional power feeding for the corresponding line.

Advantageous Effects of Invention

According to the present invention, it is possible to reduce power consumption even when use time of electrical equipment is indeterminate.

DESCRIPTION OF EMBODIMENTS

Hereinafter, embodiments of the present invention will be described in detail with reference to the accompanying drawings.

Embodiment 1

Figure 1:
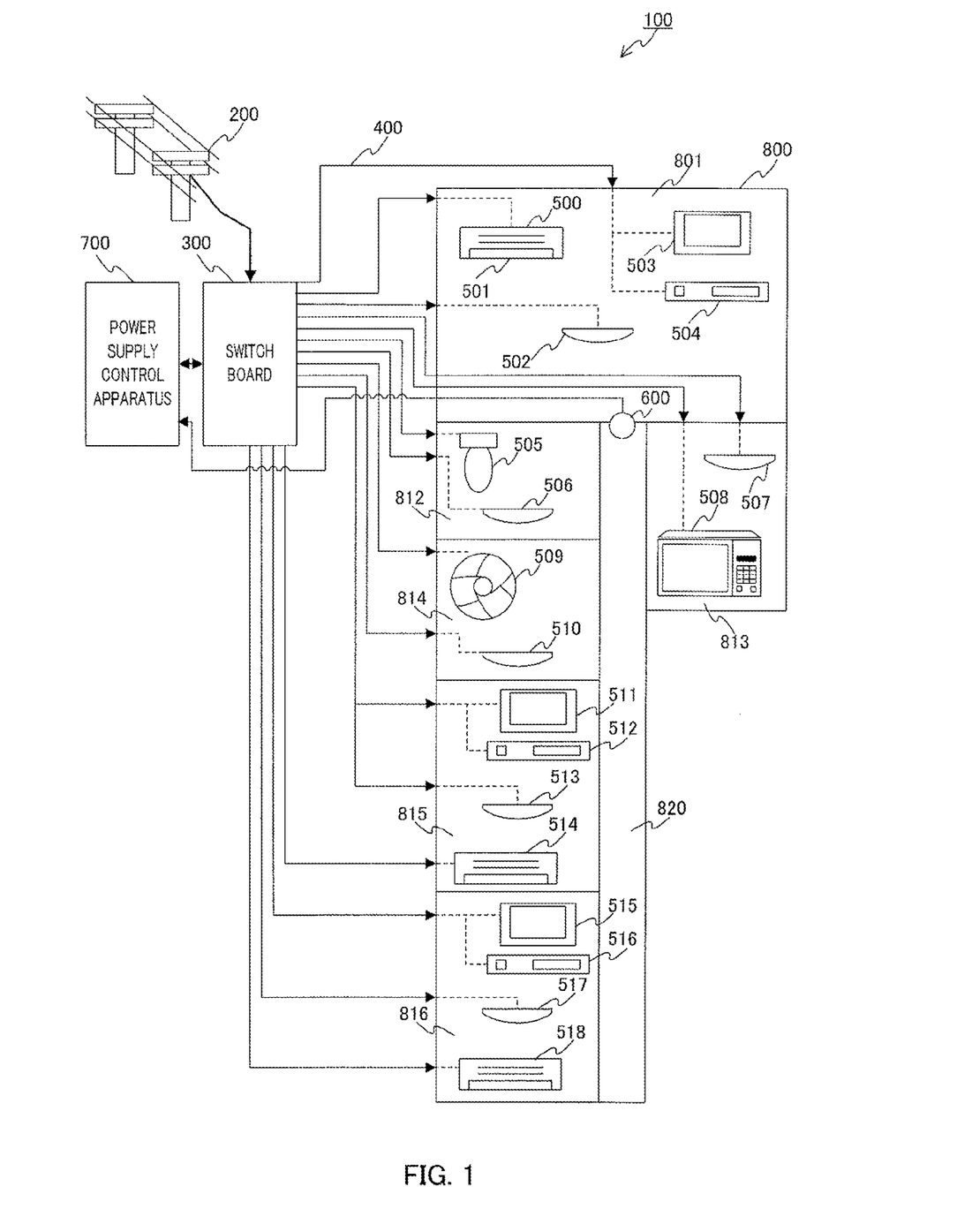
FIG. 1 is a system configuration diagram showing a configuration example of a power feed system including a power feed control apparatus according to Embodiment 1 of the present invention.

FIG. 1 is a system configuration diagram showing a configuration example of a power feed system including a power feed control apparatus according to Embodiment 1 of the present invention.

In FIG. 1, power feed system 100 includes power supply line 200, switch board 300, multiple power feed wirings 400, multiple pieces of electrical equipment (501 to 518), sensor 600, and power feed control apparatus 700.

Power supply line 200 is a facility for supplying electric power and is a commercial power supply line of a power supply company, for example.

Switch board 300 distributes power from power supply line 200 to multiple power feed wirings 400 and measures supplied power to each of power feed wirings 400. Further, switch hoard 300 is connected to power feed control apparatus 700 in a wired or wireless communicable manner and transmits power consumption information indicating a measurement result of the supplied power to power feed control apparatus 700. Moreover, switch board 300 receives control of power feed control apparatus 700, and starts and stops power feeding to each of power feed wirings 400.

Power feed wiring 400 supplies power from switch board 300 to electrical equipment 500 connected to power feed wiring 400. In the present embodiment, power feed wiring 400 is assumed to correspond to any of rooms 811 to 816 of house 800. Note that, while there can be a case in which one power feed wiring 400 corresponds to multiple rooms, there will be explained here a case in which one power feed wiring 400 is not connected across the multiple rooms. That is, there will be explained a case in which power feed wirings 400 correspond to the rooms one by one.

In the following explanation, a unit of one or multiple power feed wirings 400 for each room is called a "line". That is, power feed system 100 includes multiple lines. Here, a purpose of controlling the power feeding in a unit of the line is to make it unnecessary that a control circuit is newly added for electrical equipment 500 and a user performs registration and management for each piece of electrical equipment 500.

Note that, when the multiple lines exist for one room, the multiple lines may be divided into a line for which the power feed control is performed and a line for which the power feed control is not performed (line always requiring power feeding, line giving priority to user operation, or the like). In this case, only the line for which the power feed control is performed is an object of control.

Pieces of electrical equipment (501 to 518) are arranged in the respective rooms of house 800, and each of which is equipment that operates by consuming the power from power feed wiring 400, and, for example, is household electrical equipment such as a television set. The electrical equipment includes equipment that consumes standby power when power feeding starts (hereinafter, called "standby power consumption equipment".

Sensor 600 is an apparatus detecting a person's movement in a certain range, for example, a human detection sensor. Sensor 600 in the present embodiment is disposed in corridor 820 of house 800 and, when a person proceeds out of any room to corridor 820, that is, when a person moves between the rooms (hereinafter, simply called "movement"), sensor 600 is configured to detect the movement. Sensor 600 is connected to power feed control apparatus 700 in a wired or wireless communicable manner communication and, every time having detected movement of a person, sensor 600 transmits sensor information indicating the movement to power feed control apparatus 700.

Note that, sensor 600 is preferably installed in a place where persons enter or leave comparatively frequently, such as the living room as shown in FIG. 1. A first reason why sensor 600 is not disposed in each room is to detect movement of a person early before the person reaches each room and to start provisional power feeding for securing a start-up time, since some pieces of electrical equipment need the start-up time. A second reason is to reduce facility cost. Multiple sensors 600 may be disposed, and, for example, may be installed at two positions in a first floor corridor and a second floor corridor of a two-story house.

Here, house 800 is assumed to have, as rooms other than living room 811, toilet 812, kitchen 813, bath room 814, bed room 815, and guest room 816, in the order closer to living room 811.

In living room 811, there are disposed air conditioner 501, illumination light 502, television set 503, and recorder 504 which are connected to power feed wiring 400 of a living line. In toilet 812, there are disposed toilet seat 505 and illumination light 506 which are connected to power feed wiring 400 of a toilet line. In kitchen 813, there are disposed illumination light 507 and microwave oven 508 which are connected to power feed wiring 400 of a kitchen line. In bath room 814, there are disposed air fan 509 and illumination light 510 which are connected to power feed wiring 400 of a bath room line. In bed room 815, there are disposed television set 511, recorder 512, illumination light 513, and air conditioner 514 which are connected to power feed wiring 400 of a bed room line. In guest room 816, there are disposed television set 515, recorder 516, illumination light 517, and air conditioner 518 which are connected to power feed wiring 400 of a guest room line.

Among these pieces of electrical equipment, the present embodiment assumes toilet seat 505, air conditioners 501, 514, and 518, television sets 503, 511, and 515, recorders 504, 512, and 516, and microwave oven 508 as the standby power consumption equipment. The standby power consumption equipment needs to already operate consuming standby power before a user start to use it. That is, the standby power consumption equipment needs to receive power supply before the user moves into the room and starts to use the equipment.

Accordingly, power feed control apparatus 700 is configured to start power feeding for all the rooms before a person reaches another room, and, when having detected to which room the person moved, to stop the power feeding for the rooms except the room to which the person have moved.

Specifically, power feed control apparatus 700 first detects movement of the person according to the sensor information sent from sensor 600. When the movement of the person has been detected, power feed control apparatus 700 starts provisional power feeding for the lines (i.e., corresponding rooms) to which power is not being fed among the multiple lines and also determines whether or not there is an increase in power consumption after that, for each of the lines.

Then, when there exists a line in which power consumption has not increased, power feed control apparatus 700 assumes that the line does not correspond to a movement destination, and stops the provisional power feeding for the line.

Such power feed system 100, when a person moves, can perform power feeding for all rooms 812 to 816 before a movement destination room (hereinafter, simply called "movement destination") is determined, and can stop the power feeding for the other rooms after the movement destination has been specified. That is, power feed system 100 can perform power feeding for necessary standby power without causing the user to perform power feeding start operation every time, and also stop the power feeding for unnecessary standby power. Thereby, power feed system 100 can reduce power consumption even when use time of the electrical equipment is indeterminate.

Next, a configuration for each of the apparatuses will be explained.

First, a configuration of switch board 300 will be explained.

Figure 2:
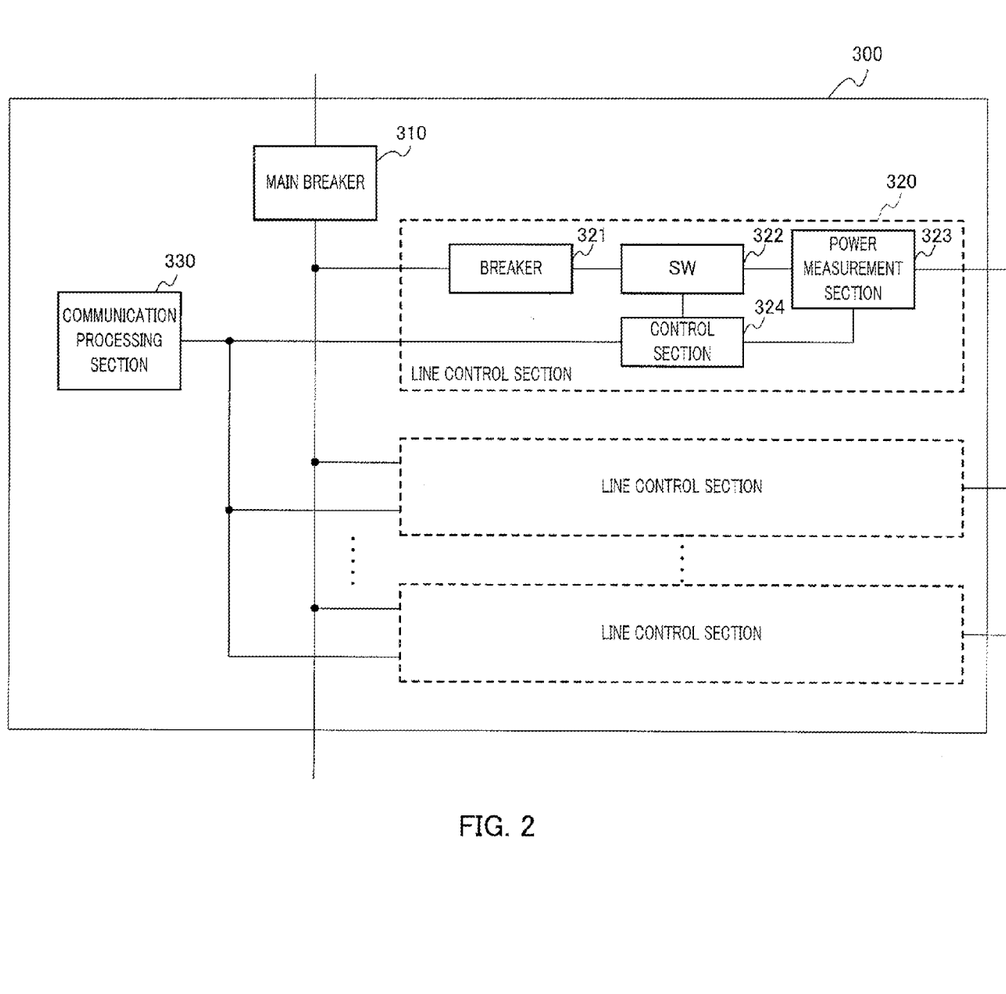
FIG. 2 is a block diagram showing a configuration example of a switch board in Embodiment 1.

FIG. 2 is a block diagram showing a configuration example of switch board 300.

In FIG. 2, switch board 300 includes main breaker 310, line control section 320, and communication processing section 330.

Main breaker 310 is connected to power supply line 200 and shuts down the power feeding when current flowing from power supply line 200 to power feed wirings 400 of whole house 800 reaches a predetermined upper limit value.

Line control section 320 is provided between main breaker 310 and power feed wiring 400 for each of the lines, and controls power feeding of the line and also measures the power thereof. Each line control section 320 includes breaker 321, switch (SW) 322, power measurement section 323, and control section 324.

Breaker 321 is connected to main breaker 310, and shuts down the power feeding when the current flowing from power supply line 200 to power feed wiring 400 of the line reaches a predetermined upper limit value.

Switch 322 switches on and off power feeding of the line by manual operation or by control from control section 324 as will be described below.

Power measurement section 323 is provided on the downstream side of switch 322, and measures power consumption of the line at a predetermined interval and outputs a measurement result to control section 324.

Control section 324 receives a request from power feed control apparatus 700 and transmits the power consumption data to power feed control apparatus 700 via communication processing section 330.

Here, the power consumption data is data obtained by adding information indicating the line to the latest power consumption measurement result input from power measurement section 323.

Further, control section 324 receives power feed control information sent from power feed control apparatus 700 via communication processing section 330 and controls on and off of switch 322 according to the received power feed control information.

Here, the power feed control information is information including information designating the line and either one of a power feed request and a power feed off request.

Note that, for the information indicating the line or the information designating the line, there is used a predetermined wiring ID which is associated with each of power feed wirings 400, for example. Further, transmission frequency of the power consumption data may be preliminarily determined, and the setting thereof may be changed optionally by a user in an allowable range. However, the power consumption data is preferably transmitted at an interval as short as possible so as to allow a person's movement or a power consumption increase in another room to be detected as early as possible.

Communication processing section 330 is connected to power feed control apparatus 700 in a wireless or wired communicable manner communication, and performs information transfer between power feed control apparatus 700 and line control section 320 in each of the lines.

As described above, switch board 300 according to the present embodiment can transmit the power consumption data for each of the lines to power feed control apparatus 700, and also can start or stop the power feeding for each of the lines according to the power feed control information from power feed control apparatus 700.

Next, a configuration of power feed control apparatus 700 will be explained.

Figure 3:
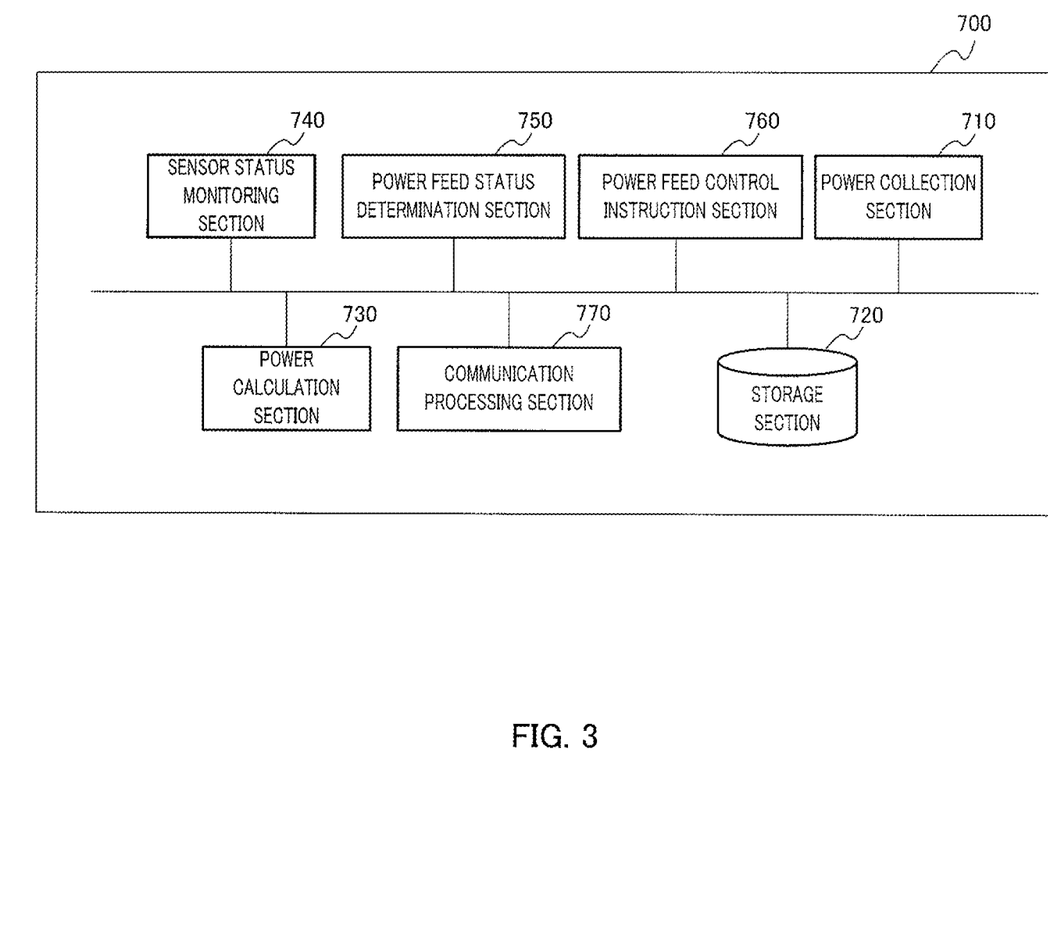
FIG. 3 is a block diagram showing a configuration example of a power feed control apparatus according to Embodiment 1.

FIG. 3 is a block diagram showing a configuration example of power feed control apparatus 700.

Power feed control apparatus 700 includes power collection section 710, storage section 720, power calculation section 730, sensor status monitoring section 740, power feed status determination section 750, power feed control instruction section 760, and communication processing section 770.

Power collection section 710 receives the power consumption data sent from switch board 300 via communication processing section 770. Then, power collection section 710 registers the received power consumption data in storage section 720.

Storage section 720 retains preliminarily registered standby power information, the power consumption data registered by power collection section 710, and power increase data registered by power calculation section 730 as will be described below.

Here, the standby power information is information indicating a total value of standby power for each of the that is, for the all pieces of electrical equipment disposed on the line. The power consumption data is temporal sequence data of the power consumption for each of the lines as described above. The power increase data is latest data of a power consumption increase from the standby power (hereinafter, called "power increase") for each of the lines. That is, the power increase data is information indicating whether or not the electrical equipment is currently used in each of the lines.

Figure 4A:
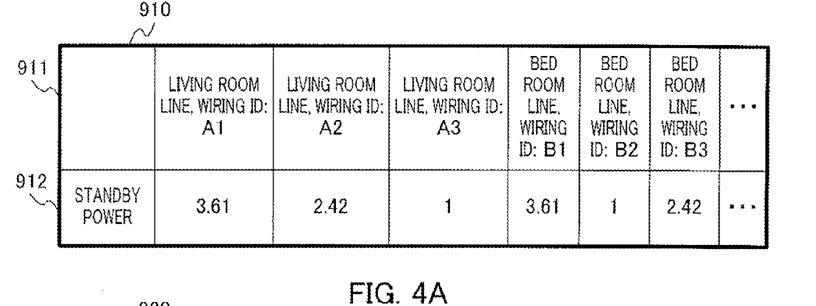
FIGS. 4A to 4C are diagrams showing a configuration example of each of information sets in Embodiment 1.
Figure 4B:
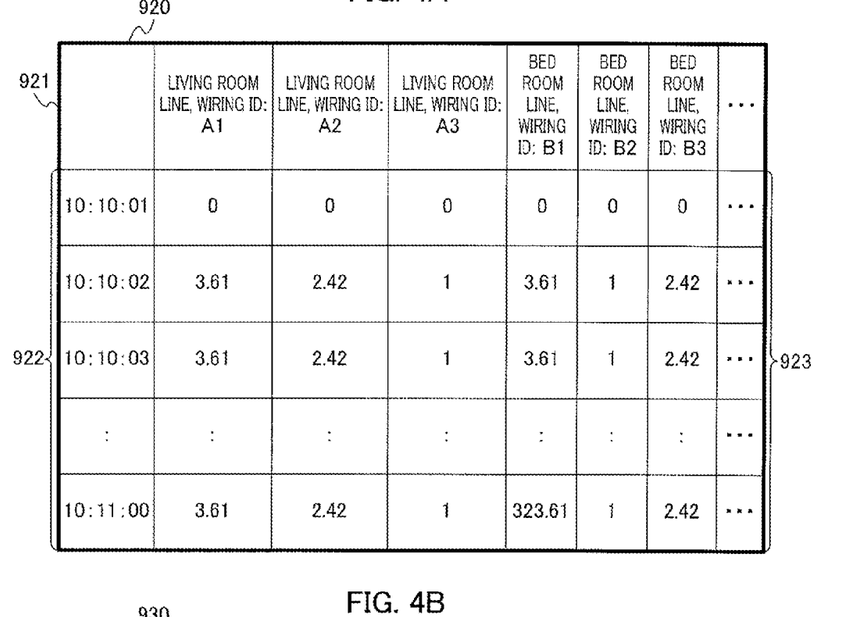
Figure 4C:
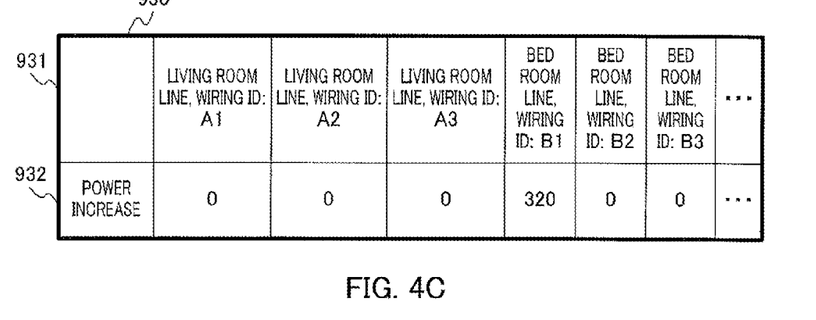

FIGS. 4A to 4C are diagrams showing a configuration example of each of the information sets stored in storage section 720. FIG. 4A shows a configuration example of the standby power information. FIG. 4B shows a configuration example of the power consumption data. FIG. 4C shows a configuration example of the power increase data.

As shown in FIG. 4A, standby power information 910, in association with wiring ID 911 which is associated with the line, describes a total value of the standby power for the corresponding line (hereinafter, simply called "standby power") in the unit of watt (w). For example, in association with a bed room line wiring ID called "B1", a standby power of "3.61 w" is described. For standby power information 910, a value input manually by a user may be described or a value obtained according to the power consumption data from switch board 300 may be described.

As shown in FIG. 4B, power consumption data 920, in association with wiring ID 921 associated with the line and time 922, describes power consumption 923 measured at the corresponding time for the corresponding wiring in the unit of watt. For example, in association with a combination of the bed room line wiring ID called "B1" and time of "10:11:00", a power consumption of "323.61 w" is described.

As shown in FIG. 4C, power increase data 930, in association with wiring ID 931 associated with the line, describes power increase 932 calculated for the power consumption at the latest time in the unit of watt. For example, immediately after time of "10:11:00", in association with the bed room line wiring ID called "B1", power increase 932 of "320 w" is described. The calculation of such power increase 932 is performed by power calculation section 730 as will be described below.

Power calculation section 730 calculates the power increase for each of the lines using standby power information 910 and power consumption data 920 stored in storage section 720, and generates power increase data 930 and registers the data in storage section 720. For example, as shown in FIGS. 4A to 4C, in the bed room line wiring ID "B1", while the standby power is "3.61 w", the latest power consumption is "323.61 w". Accordingly, power calculation section 730 registers "320 w" which is a deference therebetween.

Figure 5:
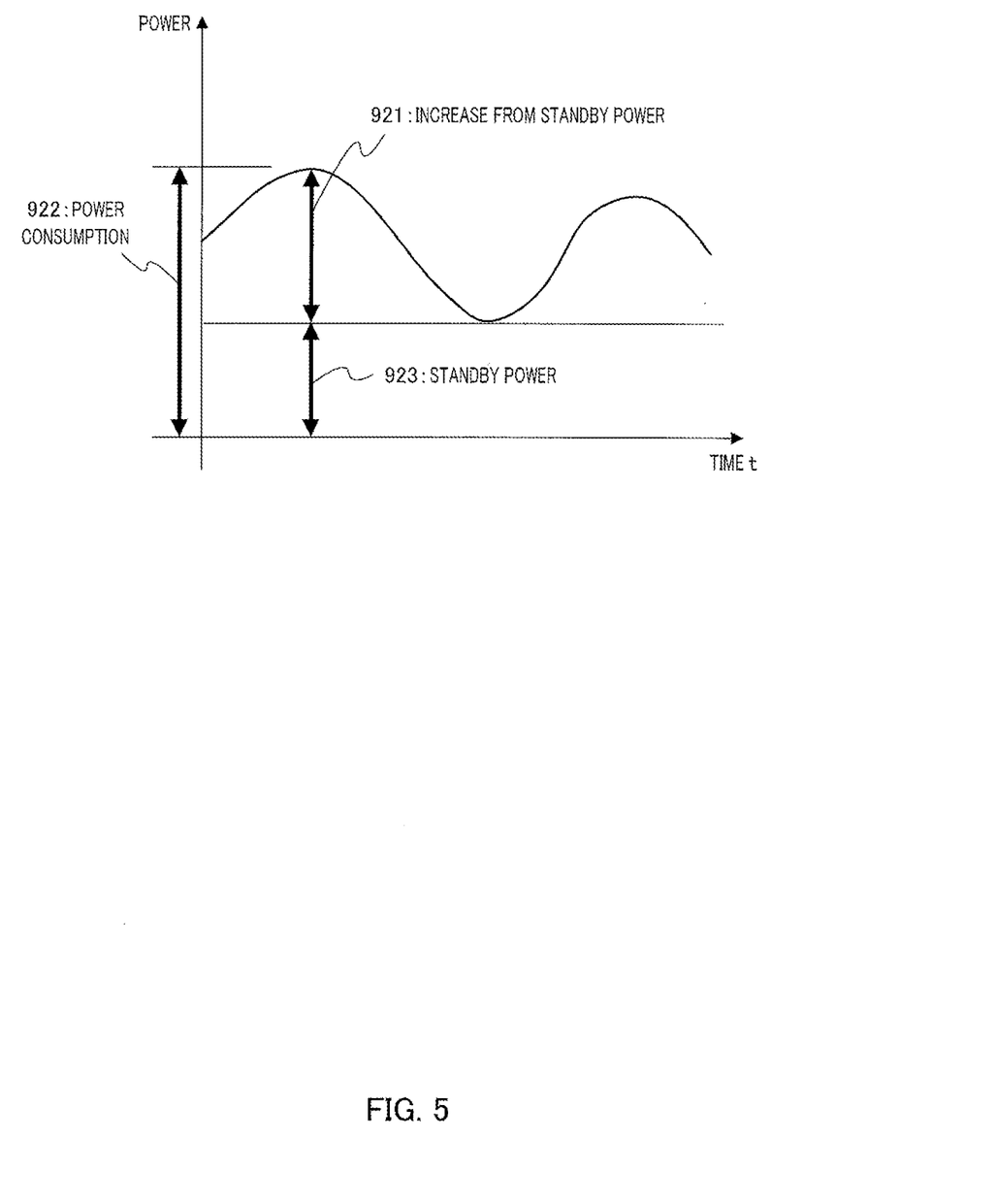
FIG. 5 is a diagram for explaining power increase in Embodiment 1.

FIG. 5 is a diagram for explaining the power increase.

As shown in FIG. 5, power increase 921 at time t is a difference between power consumption 922 at time t and standby power 923 at time t. When power increase 921 exceeds a predetermined threshold value in some line at time t, power feed status determination section 750 determines that electrical equipment is used in the line at time t and "a power increase occurs".

The threshold value used in the determination on whether or not the power increase occurs may be set to "0 w", for example. However, the threshold value used in the determination on whether or not the power increase occurs is preferably a value exceeding 0 w and smaller than a minimum value of the power increase when any piece of the electrical equipment is used, for improving accuracy of the determination. Further, this threshold value may be a different value for each of the lines.

Further, this threshold value may be a value set by calculation from a past history of the power consumption for each of the lines, or may be a value set by calculation from a typical power consumption value posted on the Internet for each kind of electrical equipment. The calculation method from the past history may be a method of storing standby power generated when the equipment is connected to an outlet, for example, for each piece of the electrical equipment, and setting the standby power as the threshold value. Alternately, the calculation method from the past history may be a method of storing power consumption for each piece of the electrical equipment and setting the minimum value thereof.

Sensor status monitoring section 740 of FIG. 3 receives the sensor information sent from sensor 600 via communication processing section 770. Then, sensor status monitoring section 740 outputs a power feed status determination request to power feed status determination section 750 every time the sensor information is received, that is, every time movement is detected.

Power feed status determination section 750 performs provisional power feeding for all the lines which are not being used by the electrical equipment (hereinafter, called "out-of-use line"), every time the power feed status determination request is input. Moreover, power feed status determination section 750 outputs the power feed request providing an instruction of performing not provisional but intrinsic power feeding to power feed control instruction section 760, for the line which is being used by the electrical equipment (hereinafter, called "in-use line"). Specifying the out-of-use line and specifying the in-use line are performed according to power increase data 930 in storage section 720, for example.

Further, power feed status determination section 750 monitors whether or not the power consumption increases, for each of the out-of-use lines to which the provisional power feeding is being performed, according to power increase data 930 after the provisional power feeding has been started. Then, power feed status determination section 750 determines whether or not there exist both of the line in which the power consumption increases and the line in which the power consumption does not increase exist in the out-of-use lines for which the provisional power feeding is being performed. When both of the lines exist, power feed status determination section 750 outputs a power feed off request providing an instruction of designating the line in which the power consumption does not increase and stopping the provisional power feeding, to power feed control instruction section 760.

Power feed control instruction section 760, every time the power feed request is input, transmits the power feed control information which provides a power feed instruction to the line designated by the power feed request, to switch board 300 via communication processing section 770. Further, power feed control instruction section 760, every time the power feed off request is input, transmits the power feed control information which provides a power feed stop instruction to the line designated by the power feed off request, to switch board 300 via communication processing section 770.

Communication processing section 770 is connected with switch board 300 and sensor 600 in a wireless or wired communicable manner, and transfers information between switch board 300 or sensor 600 and each section of power feed control apparatus 700.

Each functional section of power feed control apparatus 700 is configured with an integrated circuit, for example. Each functional section of power feed control apparatus 700 may be integrated individually into one chip, or multiple functional sections may be integrated into one chip. The integrated circuit can include an LSI (Large Scale Integration) an IC (Integrated circuit), a system LSI, a super LSI, an ultra LSI, and the like, depending on a difference in the degree of integration. Further, the integrated circuit may be implemented by a dedicated circuit or a general-purpose processor. Further, the integrated circuit may be an FPGA (Field Programmable Gate Array) which can be programmed after manufacturing or a configurable processor in which connection and setting of an internal circuit cell can be reconfigured. Moreover, each functional section of power feed control apparatus 700 may be implemented by integration using another integrated circuit technology replacing the LSI (e.g., biotechnology) according to a progress of the semiconductor technology or a different derivative technology.

Such power feed control apparatus 700 can start power feeding for the lines of all the rooms immediately before a person moves to another room. Then, power feed control apparatus 700 can detect to which room the person has moved, by power increase in each of the lines, and stop the power feeding to the rooms except the movement destination.

Next, operation of power feed control apparatus 700 will be explained.

Figure 6:
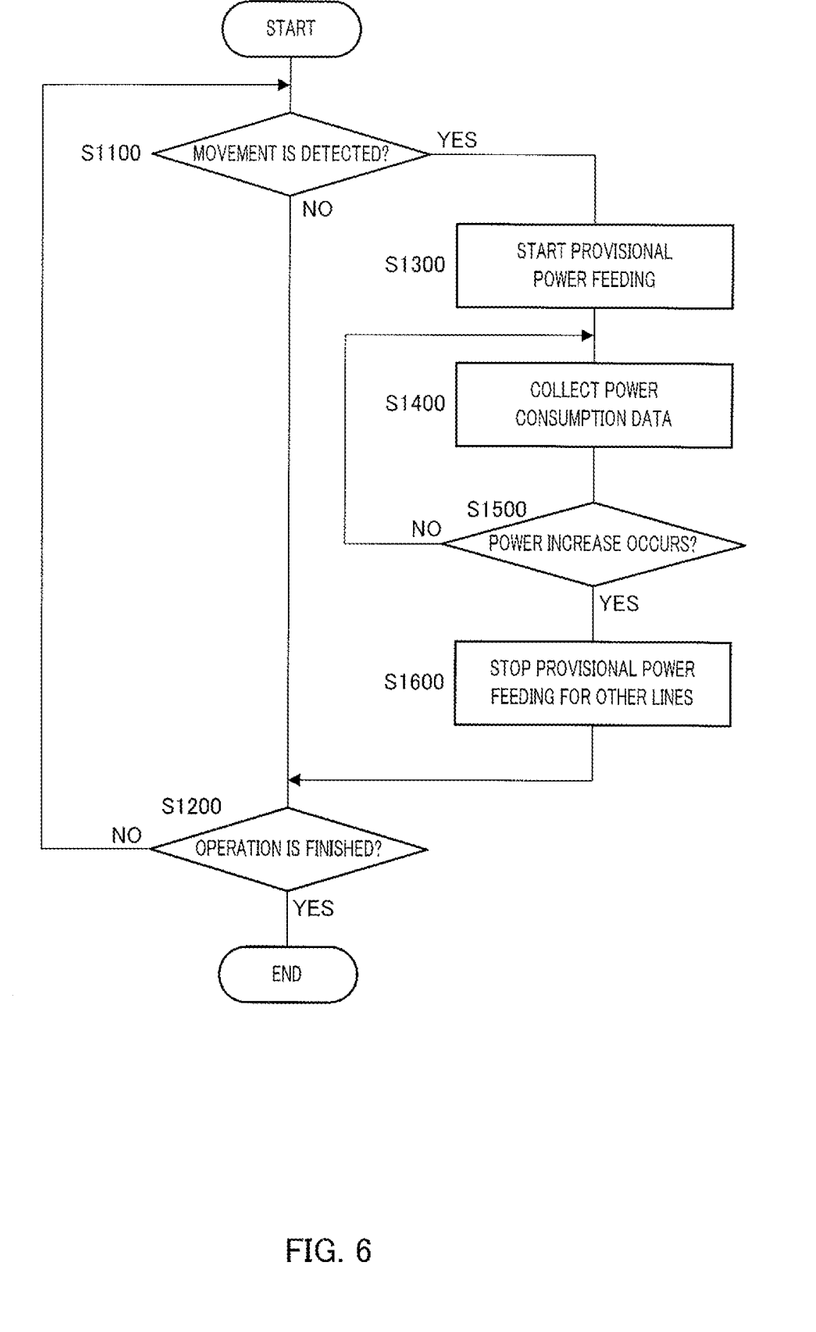
FIG. 6 is a flowchart showing an operation example of a power feed control apparatus according to Embodiment 1.

FIG. 6 is a flowchart showing an operation example of power feed control apparatus 700. Note that, it is assumed that while power feed control apparatus 700 is operating, storage of power consumption data 920 and update of power increase data 930 are being performed continuously. That is, it is assumed that storage section 720 is in a state of always storing power consumption data 920 including the latest power consumption and power increase data 930 for each of the lines, while the power consumption data is being sent.

First, in step S1100, sensor status monitoring section 740 determines whether or not a person's movement is detected, depending on whether or not the sensor information has been received from sensor 600. Note that it is assumed that power collection section 710 collects the power consumption data for each of the lines from each of line control sections 320 of switch board 300 via communication processing section 770 periodically in parallel with the determination processing of step S1100, and records the power consumption data in storage section 720.

Sensor status monitoring section 740 proceeds to step S1200 when the person's movement is not detected (NO in S1100). Further, when the person's movement is detected (YES in S1100), sensor status monitoring section 740 outputs the power feed status determination request to power feed status determination section 750 and proceeds to power feed step S1300.

In step S1300, power feed status determination section 750 causes power feed control instruction section 760 to transmit the power feed request providing an instruction of performing the provisional power feeding for the out-of-use line and performing the intrinsic power feeding for the in-use line, to switch board 300. As a result, in switch board 300, each of line control sections 320 turns on. SW 322 which has been turned off or keeps a status of SW 322 which has been turned on, according to the input power feed request.

Then, in step S1400, power collection section 710 collects the power consumption data in each of the lines from each of line control sections 320 in switch board 300 via communication processing section 770, and records the power consumption data in storage section 720.

Then, in step S1500, power feed status determination section 750 generates power increase data 930 according to power consumption data 920 and standby power information 910 which are recorded in storage section 720, and registers power increase data 930 in storage section 720. Next, power feed status determination section 750 determines whether or not there exists the out-of-use line in which power increase has occurred, from power increase data 930. That is, power feed status determination section 750 determines whether or not use of electrical equipment has started in any of the lines in which the provisional power feeding has been started.

When the out-of-use line in which power increase has occurred does not exist (NO in S1500), power feed status determination section 750 returns to step S1400 and continues collection of the power consumption data and determination on whether or not there exists an out-of-use line in which power increase has occurred. Further, power feed status determination section 750 proceeds to step S1600, when there exists the out-of-use line in which power increase has occurred (hereinafter called "power increase line")(YES in S1500).

Note that power feed status determination section 750 may stop the provisional power feeding for all the lines and proceed to step S1200, when a time for repeating the processing of step S1500 reaches a predetermined maximum value. This is a case in which a person does not move to another room or returns immediately after the movement, or a case in which electrical equipment is not used in the movement destination, for example.

In step S1600, power feed status determination section 750 specifies the out-of-use line except the power increase line as the line in which power feeding is not necessary (hereinafter, called "power feed unnecessary line"), and provides an instruction of stopping the provisional power feeding to the power feed unnecessary line. That is, power feed status determination section 750 outputs the power feed off request which designates the power feed unnecessary line, to power feed control instruction section 760, and thereby causes power feed control instruction section 760 to transmit the power feed off request to switch board 300. Then, power feed status determination section 750 proceeds to step S1200 after the instruction has been transmitted to switch board 300.

In step S1200, sensor status monitoring section 740 determines whether or not an instruction of finishing the operation is provided by user operation or the like.

When the instruction of finishing the operation is not provided (NO in S1200), sensor status monitoring section 740 returns to step S1100 and continues to monitor whether movement is made or not. Then, sensor status monitoring section 740 finishes the series of operation steps when the instruction of finishing the operation is provided (YES in S1200).

By such operation, power feed control apparatus 700 can start power feeding for all the rooms before a person reaches another room, and, after the person has reached any of the rooms, can stop the power feeding for the rooms except this room.

For example, the information stored in storage section 720 is assumed to be in a state shown in FIGS. 4A to 4C. In this case, power consumption of all the lines is "zero" and all the lines are out-of-use lines at slightly earlier time of "10:10:01", Any piece of the electrical equipment is not used at time "10:10:02" immediately after the start of the provisional power feeding, and therefore the power consumption of all the lines has the same value as the standby power.

Here, it is assumed that the user moves to the bed room and starts to use the electrical equipment corresponding to bed room line wiring ID "B1". In this case, as shown in FIGS. 4A to 4C, only the power increase in the wiring ID "B1" has a value exceeding zero. Accordingly, the bed room line including the wiring of wiring ID "B1" is specified as the power increase line, and the provisional power feeding for the other lines (power feed unnecessary line) will be stopped.

Note that it is assumed that power feed status determination section 750 groups the lines for each of the rooms which is a range to be used by a user at the same time, and performs start or stop of the provisional power feeding in the unit of group. That is, when multiple lines exist in one room and the power increase occurs at least in one of the lines, power feed status determination section 750 determines all the lines of the room as the power increase lines.

Here, it is assumed that when the person is going to move to another room from the first movement destination and the movement has been detected, all the pieces of electrical equipment enter off states in the first movement destination (states of having only standby power). In this case, the line in the first movement destination becomes the line in which the power increase does not occur although the provisional power feeding is being performed, and the provisional power feeding will be stopped when power increase occurs in the line of the second movement destination.

Further, it is assumed that when the movement to the second movement destination has been detected, any piece of the electrical equipment is in a continuous on state (state in which the power increase has occurred) in the first movement destination. In this case, not provisional but intrinsic power feeding is performed for the line of the first movement destination. Therefore, even when the power increase occurs in the line of the second movement destination, the power feeding for the line of the first movement destination will not be stopped.

As described above, power feed system 100 according to the present embodiment performs the provisional power feeding for each of the lines when a person moves, and, when the movement destination is specified according to power consumption, stops the provisional power feeding for the line which does not require power feeding. Thereby, power feed system 100 can reduce power consumption even when use time of electrical equipment is indeterminate.

Further, power feed system 100 specifies a person's movement destination according to the power consumption data which is information easily obtained from switch board 300 or the like, and therefore it is not necessary to provide a human detection sensor or the like in each room or to provide a highly accurate position sensor, or the like. Accordingly, power feed system 100 can achieve the above described power consumption reduction at an inexpensive facility cost.

Embodiment 2

Embodiment 2 of the present invention is an example configured to determine the power feed unnecessary line in consideration of an estimated time since movement has been detected until use of electrical equipment in each room is started (hereinafter, called "necessary time").

For example, in FIG. 1, when a person moves from living room 811 to another room, there is a large difference between a time period required until the person reaches toilet 812 located in the nearest position and a time period required until the person reaches guest room 816 located in the farthest position. Accordingly, when guest room 816 is a movement destination and power feeding for the line of toilet 812 is stopped after the person has reached guest room 816, a useless time period of feeding power to the line of toilet 812 becomes long. Accordingly, a power feed control apparatus according to the present embodiment determines the line, in which power increase does not occur when an elapsed time period since the movement is detected exceeds the necessary time for the room in which the line is arranged, as the power feed unnecessary line, and stops the provisional power feeding immediately.

Figure 7:
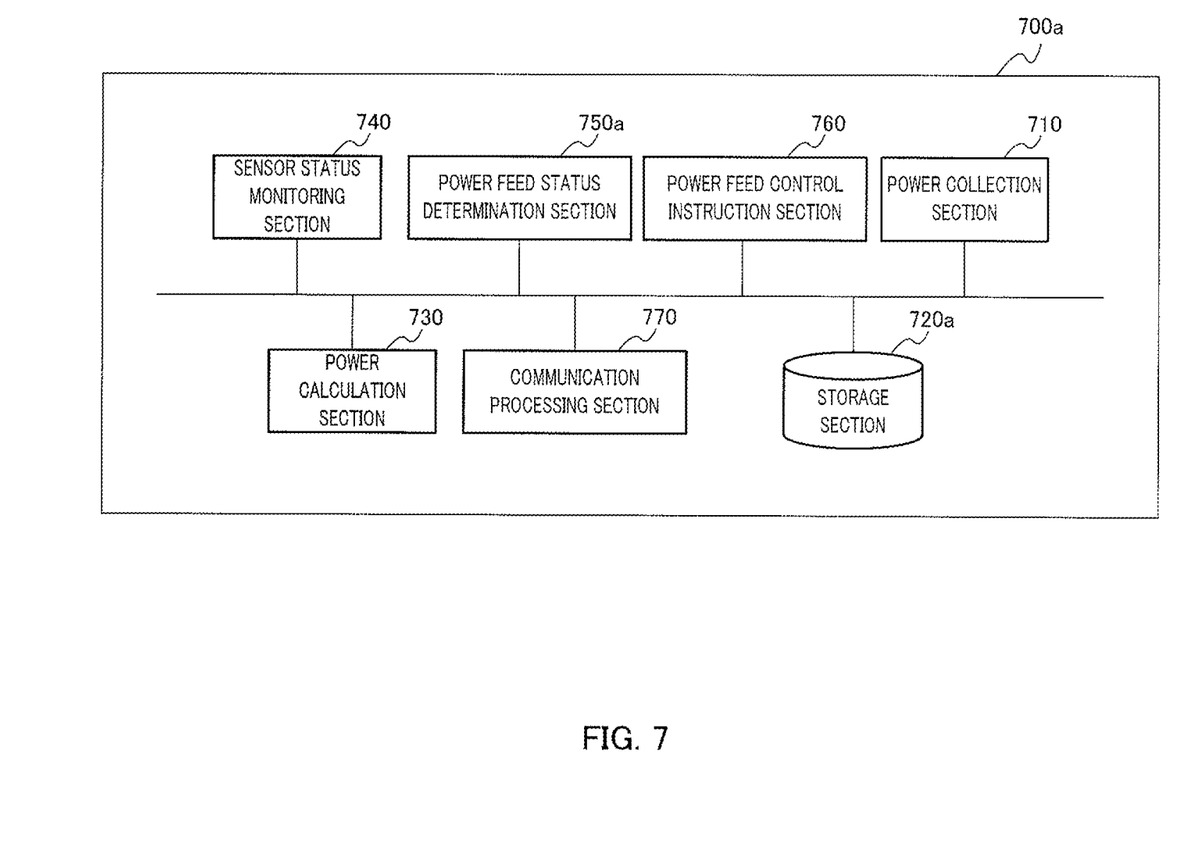
FIG. 7 is a block diagram showing a configuration of a power feed control apparatus according to Embodiment 2 of the present invention.

FIG. 7 is a block diagram showing a configuration of a power feed control apparatus according to the present embodiment, and corresponds to FIG. 3 of Embodiment 1. In FIG. 7, the same sign is used for the same part as that of FIG. 3, and explanation thereof will be omitted. Further, the power feed control apparatus according to the present embodiment is assumed to be used in power feed system 100 of Embodiment 1.

Power feed control apparatus 700a shown in FIG. 7 includes storage section 720a and power feed status determination section 750a replacing storage section 720 and power feed status determination section 750 of Embodiment 1.

Storage section 720a retains a preliminarily registered walking speed and preliminarily registered walking distance information, and estimated necessary time information registered by power feed status determination section 750a as will be described below, in addition to the information explained in Embodiment 1. The walking speed is a speed of a person's walking and "0.5 m/sec", for example. The walking speed may be set by user's manual input, or a typical value obtained from a network or the like may be set. The walking distance information is information indicating a walking distance from each of the rooms to another room. The estimated necessary time information is information indicating an estimated necessary time for each of the rooms from this room which is assumed to be a start point (hereinafter, simply called "start point") to each of the other rooms.

Figure 8:
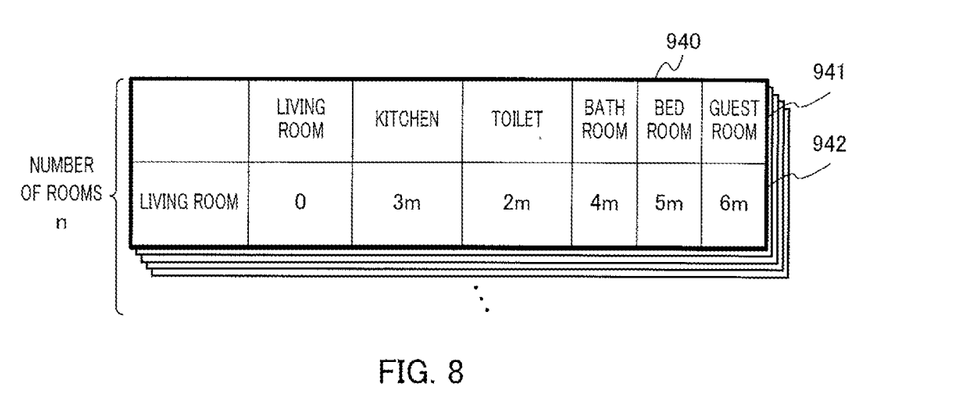
FIG. 8 is a diagram showing a configuration example of walking distance information in Embodiment 2.

FIG. 8 is a diagram showing a configuration example of the walking distance information.

As shown in FIG. 8, walking distance information 940, in association with each of rooms 941 (number of rooms is n), describes walking distance 942 from this room to each of rooms 941. For example, walking distance information 930 describes "2 m" as walking distance 942 from the living room to the toilet. In walking distance information 940, a value manually input by the user may be described, or a predetermined value may be described.

Figure 9:
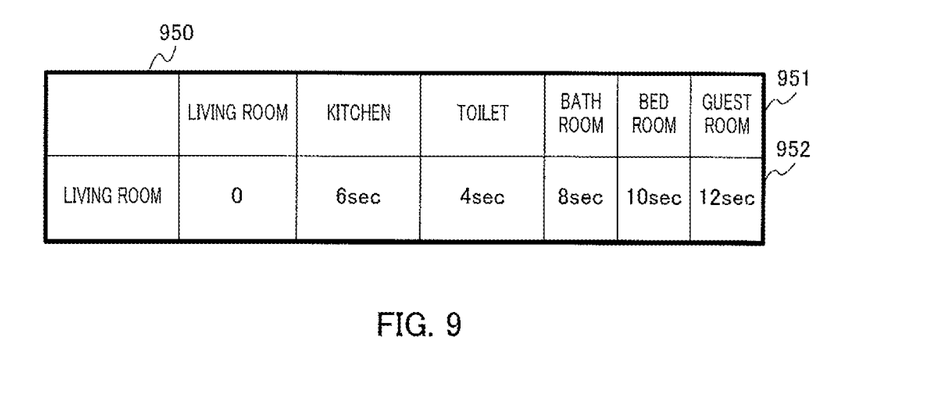
FIG. 9 is a diagram showing a configuration example of estimated necessary time information in Embodiment 2.

FIG. 9 is a diagram showing a configuration example of the estimated necessary time information.

As shown in FIG. 9, estimated necessary time information 950, in association with each of rooms 951, describes estimated necessary time 952 from the start point to this room 951. For example, when the living room is a start point, estimated necessary time information 950 describes "4 sec" as estimated necessary time 952 from the living room to the toilet. Calculation of these estimated necessary times 952 is performed by power feed status determination section 750a as will be described below.

Power feed status determination section 750a of FIG. 7 specifies a start point of a user, every time the power feed status determination request is input. Specifying the user's start point is performed by means of specifying a room in which power increase has occurred at immediately previous time, for example. Then, power feed status determination section 750a calculates an estimated necessary time from the specified start point to each of the other rooms, and generates estimated necessary time information 950 and registers the information in storage section 720a. The calculation of the estimated necessary time is performed by means of dividing the walking distance by the walking speed, for example.

For example, when power increase has occurred in the line of the living room at immediately previous time, power feed status determination section 750a specifies the living room as a start point. Further, as shown in FIG. 8, the walking distance from the living room to the toilet is "2 m". Accordingly, when the walking speed is assumed to be "0.5 m/sec", for example, the estimated necessary time to the toilet becomes "4 sec" which is obtained by means of dividing the walking distance by the walking speed. Note that power feed status determination section 750a, in consideration of a time difference between the person's arrival at the door of the room and the use start of the electrical equipment, may set a value obtained by adding a predetermined value to the value obtained by means of dividing the walking distance by the walking speed, as the estimated necessary time.

Further, power feed status determination section 750a measures an elapsed time period since time when the movement has been detected and monitors whether or not the elapsed time period has reached the estimated necessary time for each of the rooms. Then, power feed status determination section 750a, every time finding a room for which the elapsed time period has reached the estimated necessary time, determines the line of the room as the power feed unnecessary line, and outputs the power feed off request designating the line to power feed control instruction section 760. Note that power feed status determination section 750a, in consideration of the above described time difference, may use a value obtained by subtracting a predetermined value from the elapsed time, or a value obtained by adding a predetermined value to the estimated necessary time, for the comparison.

Such power feed control apparatus 700a, when a room exists between the start point and the movement destination, can stop the provisional power feeding for the line of the room before the person starts to use the electrical equipment at the movement destination.

Next, operation of power feed control apparatus 700a will be explained.

Figure 10:
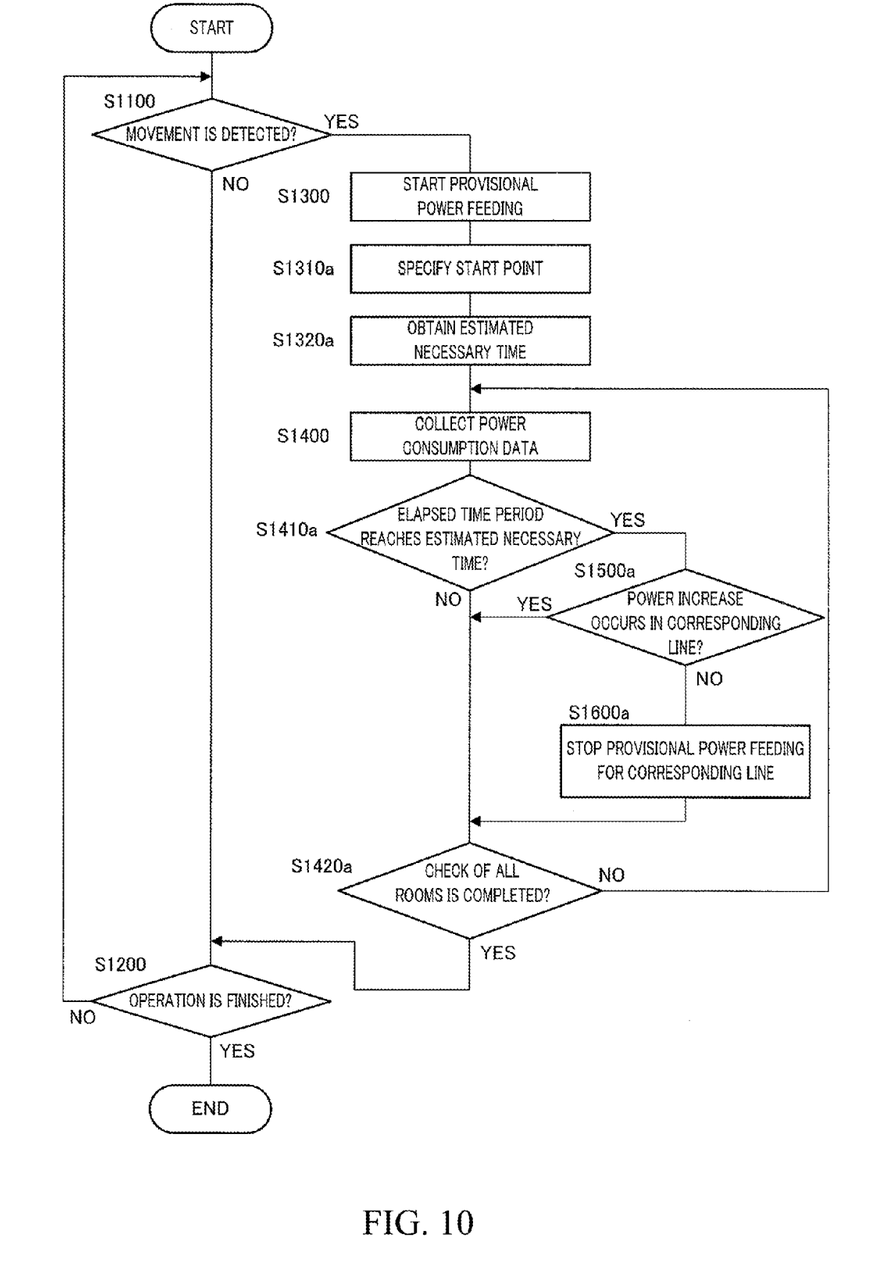
FIG. 10 is a flowchart showing an operation example of a power feed control apparatus according to Embodiment 2.

FIG. 10 is a flowchart showing an operation example of power feed control apparatus 700a, and corresponds to FIG. 6 of Embodiment 1. The same step number is provided for the same part as that of FIG. 6 and explanation thereof will be omitted.

Power feed status determination section 750a, after having provided an instruction of starting the provisional power feeding for the out-of-use line (S1300), starts measurement of elapsed time period and proceeds to step S1310a. Then, in step S1310a, power feed status determination section 750a specifies the start point of the movement. For example, power feed status determination section 750a calculates a power increase in each of the lines at time immediately before the provisional power feeding is performed (e.g., time 30 sec before, or the like) and specifies a room of the line where the power increase has occurred, as the start point.

Then, in step S1320, power feed status determination section 750a obtains the estimated necessary time to each of the rooms from the specified start point. Power feed status determination section 750a, for example, as described above, calculates estimated necessary time information 950 according to the walking speed and walking distance information 940 of storage section 720a, and obtains the estimated necessary time from calculated estimated necessary time information 950. Note that power feed status determination section 750a may preliminarily prepare a past calculation result or a value of manual input or the like as estimated necessary time information 950.

Then, after the power consumption data has been collected in step S1400, in step S1410a, power feed status determination section 750a compares the elapsed time period and the estimated necessary time for each of the rooms. Then, power feed status determination section 750a determines whether or not there exists a room for which the elapsed time period has reached the estimated necessary time.

Power feed status determination section 750a proceeds to step S1420a, when the room for which the elapsed time period has reached the estimated necessary time does not exists (NO in S1410a). Further, power feed status determination section 750a proceeds to step S1500a, when the room for which the elapsed time period has reached the estimated necessary time exists (YES in S1410a).

In step S1500a, power feed status determination section 750a determines whether or not the power increase has occurred in the line corresponding to the relevant room. Note that, at this time, power feed status determination section 750a may generate power increase data 930 and register the data in storage section 720 as in Embodiment 1, or may not register power increase data 930.

Power feed status determination section 750a proceeds to step S1420a when the power increase has occurred (YES in S1500a). Further, power feed status determination section 750a proceeds to step S1600a when the power increase has not occurred (NO in S1500a).

In step S1600a, power feed status determination section 750a specifies the line corresponding to the relevant room as the power feed unnecessary line and stops the provisional power feeding. That is, power feed status determination section 750a outputs the power feed off request designating the line corresponding to the relevant room to power feed control instruction section 760, and thereby causes power feed control instruction section 760 to transmit the power feed off request to switch board 300. Then, power feed status determination section 750a proceeds to step S1420a.

For example, when a person moves from living room 811 to bed room 815, toilet 812 is passed by. In this case, even when four seconds have elapsed since the person went out of living room 811, electrical equipment is not used in toilet 812. Accordingly, although four seconds which are the estimated necessary time to toilet 812 have elapsed, power increase does not occur in the line of toilet 812. In such a case, power feed status determination section 750a stops the provisional power feeding for the line of toilet 812.

In step S1420a, power feed status determination section 750a determines whether or not all the rooms have been checked, that is, whether or not the elapsed time period exceeds the estimated necessary times of all the rooms.

Power feed status determination section 750a returns to step S1400 when there is a room remaining unchecked (NO in S1420a) and checks the remaining room. Further, power feed status determination section 750a proceeds to step S1200 when all the rooms have been checked (YES in S1420a).

By such operation, power feed control apparatus 700a can sequentially stop the provisional power feeding for the line of the room which the person has passed by when moving.

In this manner, power feed control apparatus 700a according to the present embodiment, when a room exists between the start point and the movement destination, can stop the provisional power feeding for the line of the room before a person starts to use electrical equipment at the movement destination. Thereby, power feed control apparatus 700a can further reduce the power consumption compared to power feed control apparatus 700 according to Embodiment 1.

In each of the above explained embodiments, the power feed status determination section specifies the start point depending on whether or not power increase has occurred immediately before movement. However, when a person's position is detected, the start point may be specified depending on the detected person's position. For example, such a method becomes available when an infrared distance measuring sensor is disposed and a distance between the sensor and a door of each room is preliminarily registered.

Thereby, even when electrical equipment is not used at all in a room of the start point, the start point can be specified and on and off control of the power feeding can be performed appropriately. That is, reliability of the system is improved, and therefore it is possible to promote user's aggressive utilization and reduce the power consumption more reliably.

Moreover, when a person's position can be detected, according to Embodiment 2, the power feed status determination section can specify the movement destination and the power feed unnecessary line depending on the person's position instead of the elapsed time period.

Thereby, it is possible to estimate a room which is the movement destination and a room which is not the movement destination, in a high accuracy. That is, compared to the case of determining depending on the elapsed time period, temporal error is small and therefore it is possible to perform the determination of the power feed unnecessary line in a short time and further reduce the power consumption. Further, since the reliability of the system is improved, it is possible to promote the user's aggressive utilization and reduce the power consumption more reliably.

Note that when the sensor is disposed only in the corridor, the power feed status determination section, when a person makes a transition from an undetected state to a detected state, may specify the start point from a position immediately after the transition (i.e., position in front of a door).

Further, on the other hand, the power feed status determination section, when a person makes a transition from a detected state to an undetected state, may specify the movement destination from a position immediately before the transition (i.e., position in front of a door).

Further, when it is detected that a user has gone out to the corridor while confirming whether or not power increase has occurred, the power feed status determination section may assume that the user has started to further move to another room without consuming power in the room which the user once entered and may continue to monitor the user's movement destination.

Further, when the number of rooms, except the start point, in which power increase has occurred is not smaller than the number of persons existing in the house, the power feed status determination section may stop power feeding for the line corresponding to the room of the start point. This is because it is considered that all the persons in the house have moved to the movement destination rooms.

Further, when the number of rooms in which power increase has occurred is not smaller than the number of persons existing in the house, the power feed status determination section may specify the line of the room in which power increase has not occurred as the power feed unnecessary line. The number of persons existing in the house may be obtained from user's manual input, for example. Further, the number of persons existing in the house may be set to be the number of persons measured by a system which can count the number of persons in the house, such as an optical sensor which is disposed at an entrance and detects a person passing through the entrance, for example.

Further, the power feed status determination section may determine whether or not the provisional power feeding may be performed and whether or not power feeding may be stopped, for each of the lines according to a power feeding schedule for each of the lines or each piece of the electrical equipment. In this case, the power feed control apparatus needs to further include an input reception section such as an operation panel which obtains the power feeding schedule for each of the lines or each piece of the electrical equipment. Further, when the power feeding schedule for each piece of the electrical equipment is used, the power feed control apparatus needs to obtain information about on which line which piece of the electrical equipment is arranged.

For example, the line to which a recorder capable of programmed recording is connected could have a power feeding schedule in which power feeding is to be performed in a reserved time zone for recording regardless of a person's presence. When such a power feeding schedule is set, the power feed status determination section is configured not to specify the corresponding line as the power feed unnecessary line in the corresponding reserved time zone. Further, for the line on which only pieces of electrical equipment which are not the standby power consumption equipment such as illumination equipment are arranged, a power feeding schedule may be set such that the provisional power feeding is not necessary for a whole day. When such a power feeding schedule is set, the power feed status determination section is configured to always perform no provisional power feeding.

Note that the power feed control apparatus may collect information for the power feeding schedule such as the reserved recording schedule of the recorder automatically from each piece of the electrical equipment by performing wireless communication or wired communication with the electrical equipment. Then, the power feed control apparatus may generate the power feeding schedule according to the collected information.

Further, the power feed control apparatus may receive the setting of the power feeding schedule by user's manual input.

In addition, the power feed control apparatus may determine whether or not power feeding is to be controlled along the power feeding schedule according to a preliminarily set control rule. This control rule is set by user operation, for example.

Further, the power feed status determination section may adjust timing of issuing the power feed off request after each of the lines or each piece of the electrical equipment has been determined to be the power feed unnecessary line, according to an attribute of the line or the electrical equipment arranged on the line and a situation in each of the rooms. For example, the power feed status determination section determines whether or not each of the rooms is dark when power feeding is stopped (whether night or not, for example), according to illuminance information obtained from an illuminance sensor or clock information. Then, when the room is determined to be dark, the power feed status determination section increases an interval until the power feed off request is issued for the line on which an illumination light is arranged.

The disclosure of Japanese Patent Application No. 2010-250895, filed on Nov. 9, 2010, including the specification, drawings and abstract, is incorporated herein by reference in its entirety.

INDUSTRIAL APPLICABILITY

A power feed control apparatus and a power feed control method according to the present invention are effective as a power feed control apparatus and a power feed control method which can reduce power consumption even when use time of electrical equipment is indeterminate. In particular, a power feed control apparatus and a power feed control method according to the present invention are effective as a power saving function of an in-home energy consumption management system represented by HEMS.

REFERENCE SIGNS LIST

100 Power feed system
200 Power supply line
300 Switch board
310 Main breaker
320 Line control section
321 Breaker
322 Switch 323 Power measurement section
324 Control section
330 Communication processing section
400 Power feed wiring
600 Sensor
700, 700a Power feed control apparatus
710 Power collection section
720, 720a Storage section
730 Power calculation section
740 Sensor status monitoring section
750, 750a Power feed status determination section
760 Power feed control instruction section
770 Communication processing section

The invention claimed is:

1. A power feed control apparatus that performs power feed control for multiple lines on which pieces of electrical equipment are arranged, the power feed control apparatus comprising:
    a power feed control instruction section that performs provisional power feeding for the line to which power is not being fed, among the multiple lines;
    a power calculation section that determines whether or not there is an increase in power consumption, for each of the lines; and
    a power feed status determination section that, when the line exists in which the power consumption does not increase after the provisional power feeding has been performed, stops the provisional power feeding for the corresponding line.

2. The power feed control apparatus according to claim 1, wherein
    when there exist the line in which the power consumption increases after the provisional power feeding has been performed and the line in which the power consumption does not increase after the provisional power feeding has been performed, the power feed status determination section stops the provisional power feeding for the line in which the power consumption does not increase.

3. The power feed control apparatus according to claim 2, further comprising
    a sensor status monitoring section that detects that a person moves between multiple rooms, the multiple lines being power feed lines for the pieces of electrical equipment arranged in the multiple rooms, wherein
    the power feed control instruction section starts the provisional power feeding when the movement has been detected.

4. The power feed control apparatus according to claim 3, wherein
    every time a predetermined time period determined for each of the rooms that is a movement destination candidate elapses since time when the movement has been detected, the power feed status determination section determines whether or not the power consumption increases for the corresponding line, and stops the provisional power feeding according to a result of the determination.

5. The power feed control apparatus according to claim 4, wherein
    a value of the predetermined time period for each of the rooms is determined on a basis of the room, and
    the power feed status determination section specifies the room that is a start point of the person's movement, from an estimated position of the person, and performs the determination according to the predetermined time period that is determined on a basis of the specified room.

6. The power feed control apparatus according to claim 5, wherein
    the power feed status determination section specifies the room that is the start point of the movement, according to the power consumption in each of the lines.

7. The power feed control apparatus according to claim 5, wherein
    the sensor status monitoring section estimates the position of the person, and
    the power feed status determination section specifies the room that is the start point of the movement, according to the estimated position of the person.

8. The power feed control apparatus according to claim 5, wherein
    the power feed status determination section stops power feeding for the line corresponding to the room that is the start point of the movement, when the number of rooms in which the power consumption has increased is not smaller than the number of persons existing in the multiple rooms.

9. The power feed control apparatus according to claim 5, still further comprising
    an input reception section that obtains a power feeding schedule for each of the lines and/or each piece of the electrical equipment, wherein
    the power feed status determination section determines whether or not it is possible to start the provisional power feeding for each of the lines and/or whether or not it is possible to stop the power feeding for each of the lines, according to the obtained power feeding schedule.

10. A power feed control method that performs power feed control for multiple lines on which pieces of electrical equipment are arranged, the power feed control method comprising the steps of:
    starting provisional power feeding for the line to which power is not being fed, among the multiple lines;
    determining whether or not there is an increase in power consumption, for each of the lines;
    determining whether or not there exists the line in which the power consumption does not increase after the provisional power feeding has been performed; and
    stopping, when there exists the line in which the power consumption does not increase after the provisional power feeding has been performed, the provisional power feeding for the corresponding line.

* * * * *